United States Patent
Zhang et al.

(10) Patent No.: US 11,337,062 B2
(45) Date of Patent: *May 17, 2022

(54) SECURITY KEY REFRESH FOR DUAL CONNECTIVITY

(71) Applicant: Apple Inc., Cupertino, CA (US)

(72) Inventors: Yujian Zhang, Beijing (CN); Youn Hyoung Heo, San Jose, CA (US); Achim Luft, Braunschweig (DE)

(73) Assignee: APPLE INC., Cupertino, CA (US)

( * ) Notice: Subject to any disclaimer, the term of this patent is extended or adjusted under 35 U.S.C. 154(b) by 86 days.

This patent is subject to a terminal disclaimer.

(21) Appl. No.: 16/727,634

(22) Filed: Dec. 26, 2019

(65) Prior Publication Data

US 2020/0136684 A1 Apr. 30, 2020

Related U.S. Application Data

(63) Continuation of application No. 16/197,118, filed on Nov. 20, 2018, now Pat. No. 10,523,286, which is a
(Continued)

(51) Int. Cl.
*H04L 9/00* (2022.01)
*H04W 12/041* (2021.01)
(Continued)

(52) U.S. Cl.
CPC ........ *H04W 12/041* (2021.01); *H04B 7/0417* (2013.01); *H04L 5/0053* (2013.01);
(Continued)

(58) Field of Classification Search
CPC ..... H04W 12/041; H04W 4/70; H04W 76/14; H04W 76/10; H04W 24/02;
(Continued)

(56) References Cited

U.S. PATENT DOCUMENTS 9,210,675 B2   12/2015   Dinan
9,949,297 B2   4/2018   Uemura et al.
(Continued)

FOREIGN PATENT DOCUMENTS

WO   2009097456 A1   8/2009
WO   2013009892 A1   1/2013
WO   2014182911 A1   11/2014

OTHER PUBLICATIONS

U.S. Appl. No. 14/778,098, Examiner Interview Summary, dated Feb. 26, 2019, 2 pages.
(Continued)

*Primary Examiner* — Josnel Jeudy

(57) ABSTRACT

Embodiments have a master eNB with a control plane and optional data plane to user equipment and a secondary eNB with a data plane to the user equipment. The user equipment thus uses both the master eNB and the secondary eNB for data communications while receiving control information from only the master eNB. The master eNB and secondary eNB are connected with an X2 interface. When the secondary eNB desires to refresh its security key, it informs the master eNB using the X2 interface. The master eNB then uses its control plane with the user equipment to initiate a security key refresh for the secondary eNB.

20 Claims, 7 Drawing Sheets

Related U.S. Application Data continuation of application No. 14/778,098, filed as application No. PCT/US2014/037316 on May 8, 2014, now abandoned.

(60) Provisional application No. 61/821,635, filed on May 9, 2013.

(51) Int. Cl.

| | | |
|---|---|---|
| *H04B 7/0417* | (2017.01) | |
| *H04W 52/02* | (2009.01) | |
| *H04L 27/00* | (2006.01) | |
| *H04W 4/70* | (2018.01) | |
| *H04W 76/14* | (2018.01) | |
| *H04W 76/10* | (2018.01) | |
| *H04L 43/16* | (2022.01) | |
| *H04L 5/00* | (2006.01) | |
| *H04W 72/04* | (2009.01) | |
| *H04W 72/12* | (2009.01) | |
| *H04W 24/02* | (2009.01) | |
| *H04W 72/10* | (2009.01) | |
| *H04L 27/36* | (2006.01) | |
| *H04W 88/02* | (2009.01) | |

(52) U.S. Cl.
CPC .......... *H04L 27/0008* (2013.01); *H04L 43/16* (2013.01); *H04W 4/70* (2018.02); *H04W 24/02* (2013.01); *H04W 52/0209* (2013.01); *H04W 52/0216* (2013.01); *H04W 52/0229* (2013.01); *H04W 52/0235* (2013.01); *H04W 72/0406* (2013.01); *H04W 72/0413* (2013.01); *H04W 72/0453* (2013.01); *H04W 72/10* (2013.01); *H04W 72/12* (2013.01); *H04W 76/10* (2018.02); *H04W 76/14* (2018.02); *H04L 5/006* (2013.01); *H04L 27/362* (2013.01); *H04W 88/02* (2013.01); *Y02D 30/70* (2020.08)

(58) Field of Classification Search
CPC ......... H04W 52/0209; H04W 52/0216; H04W 52/0229; H04W 52/0235; H04W 72/0406; H04W 72/0413; H04W 72/0453; H04W 72/10; H04W 72/12; H04B 7/0417; H04L 5/0053; H04L 27/0008; H04L 43/16; H04L 5/006; H04L 27/362; Y02D 30/70
USPC ........................................................ 380/273
See application file for complete search history.

(56) References Cited

U.S. PATENT DOCUMENTS

| | | | | |
|---|---|---|---|---|
| 10,116,685 | B2* | 10/2018 | Basu Mallick | ....... H04L 63/068 |
| 2007/0105585 | A1 | 5/2007 | Lee et al. | |
| 2009/0047950 | A1 | 2/2009 | Doppler et al. | |
| 2011/0105116 | A1 | 5/2011 | Kim et al. | |
| 2011/0310833 | A1 | 12/2011 | Lee et al. | |
| 2012/0129499 | A1 | 5/2012 | Li | |
| 2012/0163600 | A1* | 6/2012 | Kim | .................... H04W 12/033 380/270 |
| 2012/0289231 | A1 | 11/2012 | Balachandran et al. | |
| 2013/0010641 | A1 | 1/2013 | Dinan | |
| 2013/0114813 | A1 | 5/2013 | Chai | |
| 2014/0181904 | A1* | 6/2014 | Craig | ................ H04W 36/0038 726/3 |
| 2014/0182911 | A1 | 11/2014 | Zhang et al. | |
| 2015/0327243 | A1 | 11/2015 | Yin et al. | |
| 2016/0021581 | A1* | 1/2016 | Deenoo | ............. H04W 36/0055 370/331 |
| 2016/0029213 | A1* | 1/2016 | Rajadurai | ......... H04W 12/0433 380/283 |
| 2016/0157095 | A1 | 6/2016 | Zhang et al. | |
| 2016/0157293 | A1 | 6/2016 | Pazhyannur et al. | |
| 2016/0249210 | A1* | 8/2016 | Chang | ................... H04L 63/062 |
| 2016/0337848 | A1* | 11/2016 | Chang | ............... H04W 12/0431 |
| 2017/0156060 | A1* | 6/2017 | Wu | ........................ H04L 9/0861 |
| 2018/0083688 | A1 | 3/2018 | Anil et al. | |
| 2018/0368107 | A1 | 12/2018 | Babaei et al. | |
| 2019/0089425 | A1 | 3/2019 | Zhang et al. | |
| 2020/0359450 | A1* | 11/2020 | Xu | ........................ H04W 36/04 |
| 2021/0058426 | A1* | 2/2021 | Basu Mallick | ....... H04L 63/068 |

OTHER PUBLICATIONS

U.S. Appl. No. 14/778,098 , Restriction Requirement, dated Feb. 27, 2017, 5 pages.
U.S. Appl. No. 14/778,098 , Response to Restriction Requirement, dated Feb. 27, 2017, 9 pages.
U.S. Appl. No. 14/778,098 , Examiner Interview Summary, dated Jan. 3, 2018, 3 pages.
U.S. Appl. No. 14/778,098 , Non-Final Office Action, dated Jul. 13, 2018, 8 pages.
U.S. Appl. No. 14/778,098 , Preliminary Amendment, dated Jun. 1, 2016, 11 pages.
U.S. Appl. No. 14/778,098 , Non-Final Office Action, dated Jun. 13, 2017, 10 pages.
U.S. Appl. No. 14/778,098 , Response to Non-Final Office Action, dated Jun. 13, 2017, 13 pages.
U.S. Appl. No. 14/778,098 , Advisory Action, dated Mar. 9, 2018, 4 pages.
U.S. Appl. No. 14/778,098 , Final Office Action, dated Nov. 28, 2017, 10 pages.
U.S. Appl. No. 14/778,098 , Response to Final Office Action, dated Nov. 28, 2017, 8 pages.
14795314.5 , Response to Extended European Search Report, dated Jun. 2, 2017, 10 pages.
14795314.5 , Extended European Search Report, dated Nov. 17, 2016, 8 pages.
U.S. Appl. No. 16/197,118 , Notice of Allowance, dated Aug. 26, 2019, 9 pages.
PCT/US2014/037316 , International Search Report and Written Opinion, dated Sep. 16, 2014, 9 pages.

* cited by examiner

SECURITY KEY REFRESH FOR DUAL CONNECTIVITY

PRIORITY CLAIM

This application is a continuation of U.S. patent application Ser. No. 16/197,118, filed Nov. 20, 2018, which is a continuation of U.S. patent application Ser. No. 14/778,098, filed Sep. 18, 2015, which is a U.S. National Stage Application under 35 U.S.C. 371 from International Application No. PCT/US2014/037316, filed May 8, 2014, which application claims the benefit of priority to U.S. Provisional Patent Application Ser. No. 61/821,635, filed May 9, 2013, all of which are incorporated herein by reference in their entirety.

TECHNICAL FIELD

Embodiments pertain to wireless communications. More particularly, some embodiments relate to User Equipment (UE) that have dual connectivity through two enhanced Node Bs (eNB), a Master eNB (MeNB) and a Secondary eNB (SeNB).

BACKGROUND

Global mobile traffic is growing at an ever-expanding pace. As the demand for wireless capacity increases, numerous technologies are being explored to increase a carrier's capacity. Some UE may be connected to two eNBs, that service an overlapping area where the UE is located. This allows dual connectivity for the UE to the two eNBs and allows for Carrier Aggregation (CA) to use the bandwidth of both eNBs. The multiple eNBs can reduce the frequency of handovers and its associated overhead.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Various modifications to the embodiments will be readily apparent to those skilled in the art, and the generic principles defined herein may be applied to other embodiments and applications without departing from the scope of the disclosure. Moreover, in the following description, numerous details are set forth for the purpose of explanation. However, one of ordinary skill in the art will realize that embodiments of the disclosure may be practiced without the use of these specific details. In other instances, well-known structures and processes are not shown in block diagram form in order to not obscure the description of the embodiments with extraneous detail. Thus, the present disclosure is not intended to be limited to the embodiments shown, but is to be accorded the widest scope consistent with the principles and features disclosed herein.

Dual connectivity, or Inter-enhanced NodeB (eNB) carrier aggregation (CA) has been proposed for the future enhancement of carrier aggregation. In dual connectivity, the serving cells are operated by different eNBs. For example, a primary cell (PCell) is served from the Master eNB (MeNB) and a secondary (SCell) is served from the Secondary eNB (SeNB). One motivation of dual connectivity is to avoid frequent handovers in heterogeneous deployment. As used herein, the MeNB is the eNB that terminates at least the S1 interface to the Mobility Management Entity (MME) (e.g., has a control plane to the UE). The SeNB is the eNB that provides additional radio resources for the UE but is not the MeNB.

Figure 1:
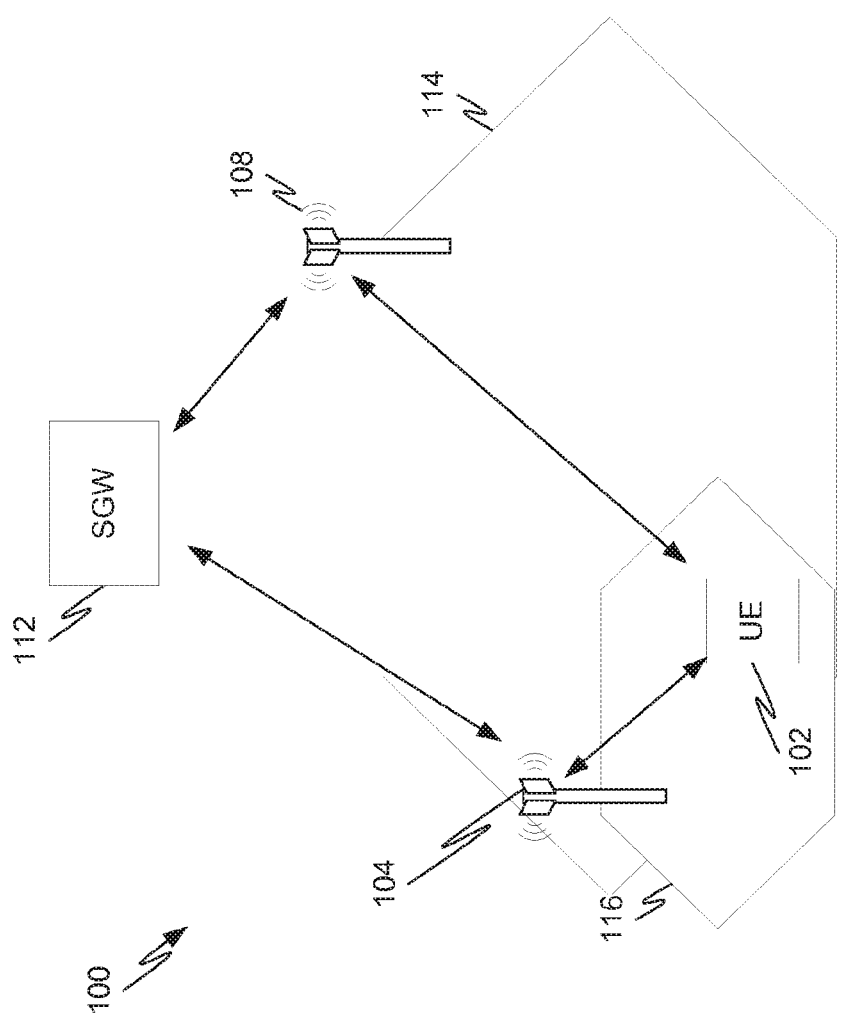
FIG. 1 illustrates an example architecture with UE being served by both a master eNB and a secondary eNB.

FIG. 1 illustrates an example architecture 100 with UE 102 being served by both a MeNB 108 and a SeNB 104. Both eNBs can be connected to a serving gateway (SGW) 112. If the UE 102 were only connected to one or the other of the MeNB 108 or SeNB 104 (as opposed to both), handovers would be more frequent. This can be illustrated by considering the activities of the UE 102 as it moves within the MeNB cell coverage 114.

In some, although not all, embodiments, the coverage area 114 of the MeNB 108 is larger than the SeNB 104 coverage area 116. When the coverage of the SeNB 116 is smaller than that of the MeNB coverage 114, the UE 102 needs to handover to the MeNB 108 or a different SeNB (not shown) if the UE 102 is only connected to the SeNB 104. On the other hand, if the UE 102 is connected to both the MeNB 108 and the SeNB 104, handover is not required when the UE 102 moves beyond the coverage 116, but offloading to the SeNB 104 cannot be provided, since the UE 102 is only connected to the MeNB 108. Therefore, to achieve offloading and avoid the frequent handover, carrier aggregation (CA) can be supported.

In dual connectivity, the UE is served by both the MeNB 108 and the SeNB 104. If the MeNB 108 is responsible for the mobility management, the UE 102 does not need to handover as long as the UE 102 is moving within the cell coverage 114 provided by MeNB 108. Furthermore, the UE 102 can use the SeNB 104 for data transmission to take advantage of offloading to the SeNB 104. The change from one small cell coverage area (e.g., 116) to another small coverage area (not shown) is supported with small cell addition/removal instead of handover.

This disclosure uses the terms MeNB and SeNB. However, other terms may be used in place of these chosen terms. For example, MeNB can be denoted as anchor eNB or primary eNB, while SeNB can be denoted as assisting eNB or small cell eNB.

In current LTE systems, in order to protect the data from being received by a third party or to detect the change made by a third party, ciphering and integrity protection are supported. In the access stratum (AS) level, both ciphering and integrity protection are applied for the Radio Resource Control (RRC) signaling (e.g., control plane) while only ciphering is applied for the user data (e.g., user plane).

Figure 2:
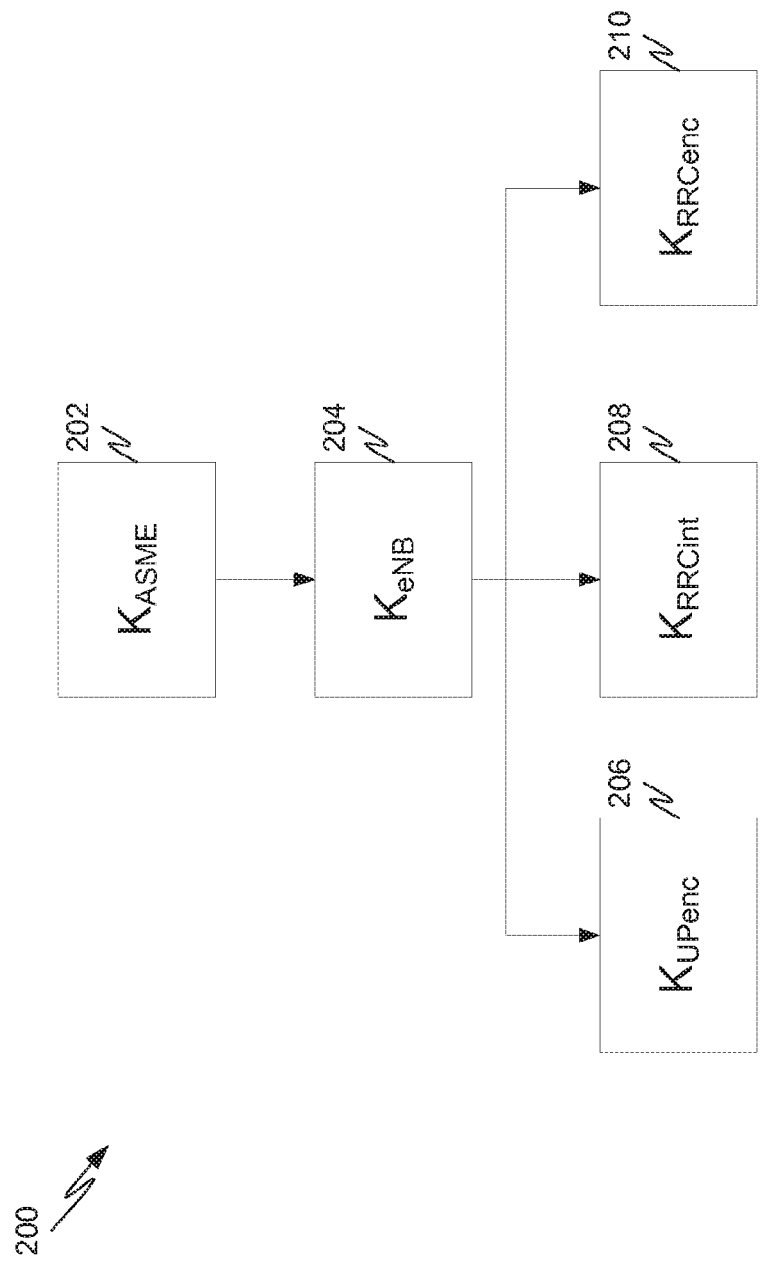
FIG. 2 illustrates a key hierarchy.

The RRC layer is responsible for AS security key handling and the AS security procedure. The Packet Data Convergence Protocol (PDCP) layer performs integrity protection and ciphering of RRC signaling as well as ciphering of user plane data. The integrity protection and ciphering uses a hierarchical set of keys, illustrated in FIG. 2. One key, $K_{RRCint}$ 208 is used for RRC signaling integrity protection, while other keys, $K_{UPenc}$ 206 and $K_{RRCenc}$ 210, are used for ciphering of user plane and control plane information, respectively. All three keys are generated from a single key, $K_{eNB}$ 204, and the AS derives a $K_{eNB}$ 204 from $K_{ASME}$ 202, which is a common secret key available in both the UE and the network (e.g., Mobility Management Entity (MME)).

During handover, the source eNB derives a key, $K_{eNB*}$, which is used in the target eNB. For example, in X2 handover, the source eNB performs a vertical key derivation in case it has an unused Next Hop (NH) and Next Hop Chaining Counter (NCC) pair. The source eNB first computes $K_{eNB*}$ from the target cell Physical Cell Identifier (PCI), its frequency Radio Frequency Channel Number on Download (EARFCN-DL), and either the currently active $K_{eNB}$ (in case of horizontal key derivation) or the NH (in case of vertical key derivation).

Figure 3:
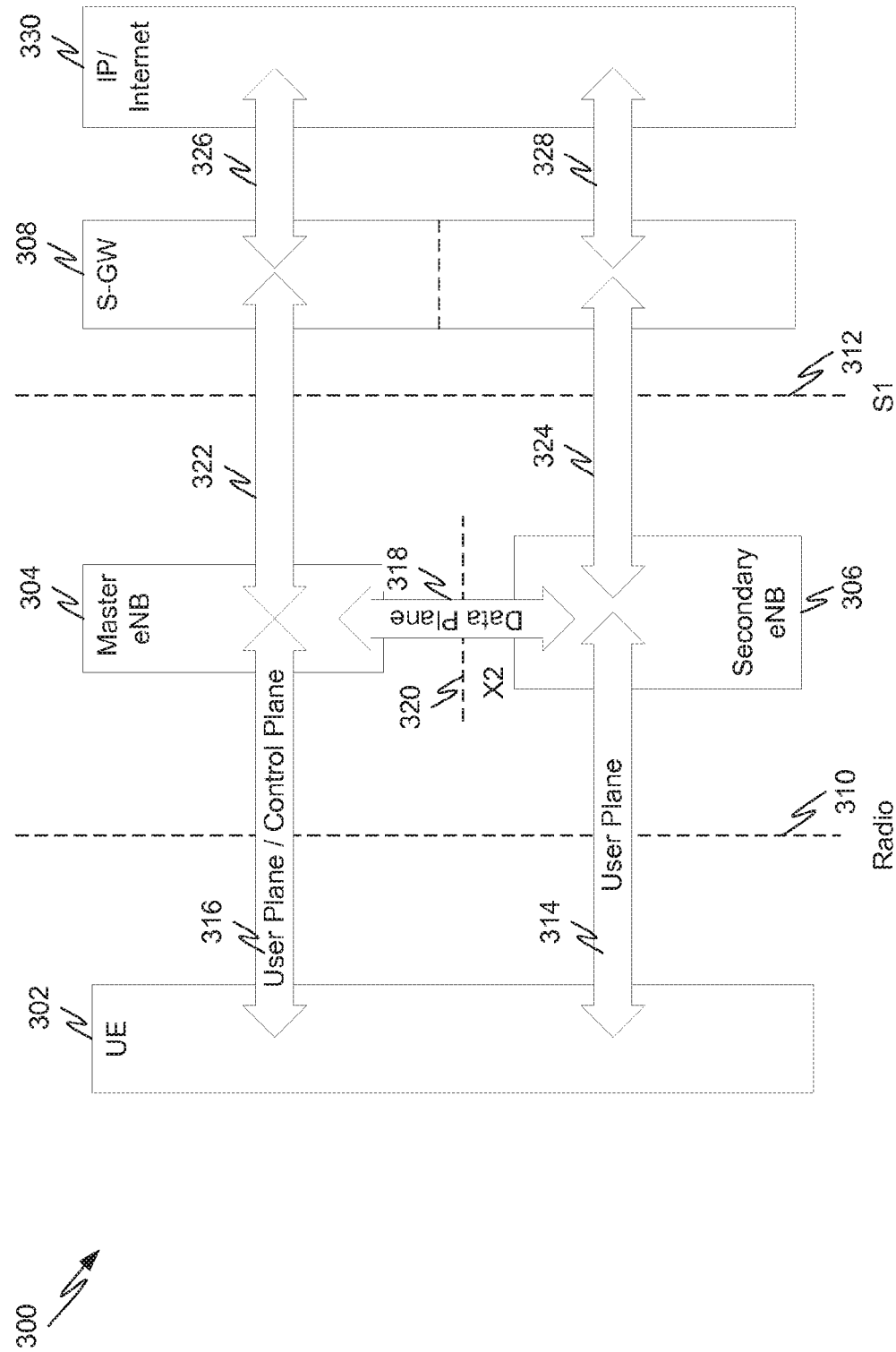
FIG. 3 illustrates an example architecture with UE being served by both a master eNB and a secondary eNB.

FIG. 3 illustrates an example architecture 300 with UE 302 being served by both a MeNB 304 and a SeNB 306. UE 302 has both a user plane as well as a control plane (e.g., RRC) with the MeNB 304 as indicated by arrow 316. However, UE 302 only has a user plane with the SeNB 306 as indicated by arrow 314. The MeNB 304 and the SeNB 306 have an X2 interface 320 that provides a data plane 318 between them. Both the MeNB 304 and the SeNB 306 are connected over an S1 interface 312 to a SGW 308 as illustrated by arrows 322 and 324, respectively. The SGW 308 used by the MeNB and the SeNB can be the same SGW or the eNBs can use different SGWs. The SGW 308 can provide a data connection 326/328 to the internet or other Internet Protocol (IP) network 330. The connections from UE 302 back to the internet 330 are called Evolved Packet System (EPS) Bearers and represent a virtual connection between the two endpoints. More generally, an EPS bearer is a virtual connection between any two endpoints, not just a data connection to the internet. Thus, bearers can be of different types, such as a signaling bearer, a data bearer, and so forth. Such bearers provide a transport service with specific Quality of Service (QoS) attributes.

Figure 4:
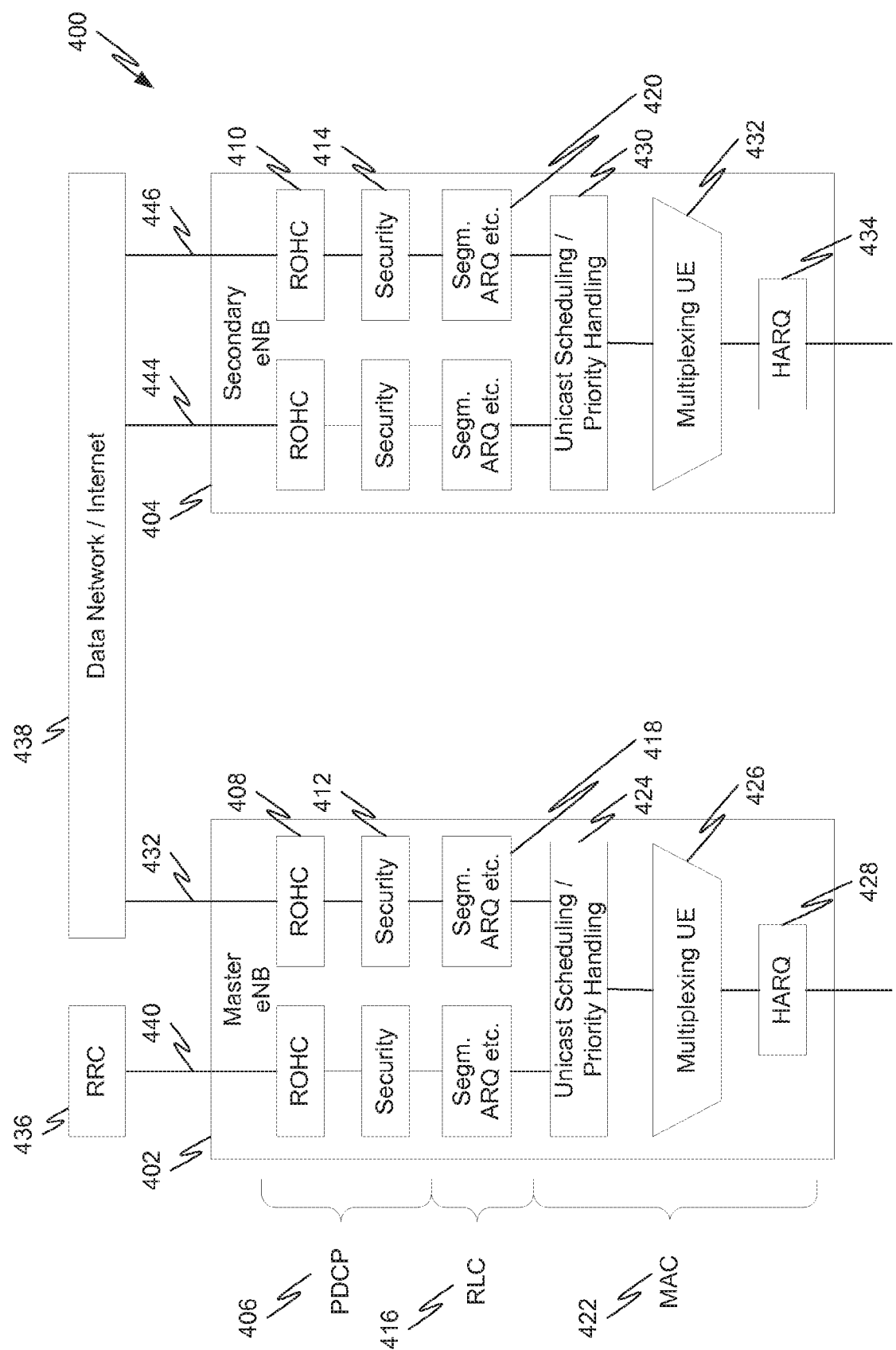
FIG. 4 illustrates an example diagram illustrating RRC, PDCP, RLC, and MAC layers for a master eNB and a secondary eNB.

FIG. 4 illustrates an example diagram 400 illustrating Radio Resource Control (RRC) layer 436, Packet Data Convergence Protocol (PDCP) layer 406, Radio Link Control (RLC) layer 416, and Machine Access Control (MAC) layer 422 for a MeNB 402 and a SeNB 404. The MeNB 402 may comprise a plurality of incoming connections such as a connection 440 to the Radio Resource Control (RRC) layer 436 and a data connection 442, which connects through a serving gateway (not shown) to a data network 438 such as the internet. The RRC layer 436 is responsible for AS security key handling and AS security procedure, as previously described. Connection to this layer is what allows the MeNB 402 to have a control plane connection to the UE (not shown). The control plane connection to the UE allows the MeNB to perform such functions as security key refresh with the UE.

Incoming IP packets arrive over the data connection 442. The PDCP layer 406 processes these packets. The PDCP layer 406 comprises Robust Header Compression (ROHC) block 408 and security block 412 that operate according to known methods. As discussed above, the PDCP layer 406 performs integrity protection and ciphering of RRC signaling and ciphering of user plane data.

The RLC layer 416 performs such tasks as segmentation, Automatic Repeat Request (ARQ), and so forth 222. The Machine Access Control (MAC) layer 422 includes such functions as unicast scheduling/priority handling 424, multiplexing for various UE 426, Hybrid Automatic Repeat Request (HARQ) 428.

The SeNB 404 is configured similarly with a PDCP layer 406 comprising ROHC 410 and security 414, a RLC layer 416 with segmentation, ARQ, and so forth 420, and a MAC layer with unicast scheduling, priority handling 430, UE multiplexing 432 and HARQ 434. However, the SeNB 404 has two data connections 444/446 and no RRC connection. Thus, the SeNB 404 has no control plane to the UE. Thus while ciphering is performed in the SeNB 404, there is no way for the SeNB to do a security key refresh with the UE since no control plane exists between them. In general, security key refresh is performed when PDCP COUNTs (e.g., a count value included in the packets handled by the PDCP layer) are about to wrap around.

Since the MeNB 402 does have a control plane with the UE and since the SeNB 404 has a data connection (e.g., the X2 connection of FIG. 3) with the MeNB 402, the SeNB 404 can exchange appropriate information about a security key refresh with the MeNB 402 and the MeNB 402 can send RRC signaling to the UE in order to effectuate the security key refresh for the corresponding SeNB 404. Embodiments for example procedures are discussed in FIGS. 5 and 6.

Figure 5:
FIG. 5 illustrates an example embodiment for key refresh of a secondary eNB.

FIG. 5 illustrates an example embodiment 500 for key refresh of a SeNB 506. In this embodiment, a secondary cell release/addition procedure is used to generate a new security key at the SeNB 506 and at the UE 502. The message exchanges of FIG. 5 are representative of the removal/addition procedures.

When the SeNB 506 desires to refresh its security key, it sends a security key refresh request message 508 to the MeNB 504. The term "security key refresh request" is an example message. Other messages and message names can be used, as long as the message is used to initiate the security key refresh. The security key refresh may be triggered by various factors. In one embodiment, the SeNB 506 initiates the security key refresh when its PDCP counts in the EPS bearers (e.g., data connection 444/446 of FIG. 4) configured at the SeNB 506 are about to wrap around. Since there can be multiple data connections/EPS bearers for the SeNB 506, the security key refresh may be triggered when any of the PDCP counts are about to wrap. The security key refresh request message 508 contains the information needed for the MeNB 504 to initiate the refresh using the release/addition procedures. In one embodiment, the message may contain a field indicating the time estimate of when a PDCP count is expected to wrap so that a time from which the new key should be used can be set. Note that this time can be set by the SeNB 506, in which case the security key refresh message can contain a time from which the new key should be used rather than, or in addition to, the time estimate of when a PDCP count is expected to wrap.

The MeNB 504 initiates the release procedure in response to receiving the security key refresh request message 508. The secondary cell release procedure is shown collectively as 510 in FIG. 5. During the release procedure, the SeNB 506 is removed from the UE 502 secondary cell list. When the SeNB 506 is removed from handling the UE 502, if pending packets or other information transfer is in process, the MeNB might need to handle the EPS bearers originally processed by the SeNB 506 while the SeNB 506 is unable to handle its EPS bearers (since it has been removed from the UE 502). The MeNB 504 can handle the SeNB 506 EPS bearers itself or delegate handling to an appropriate SeNB that has connection to UE 502. Exchanges to handle EPS bearers are not specifically shown, but information allowing the MeNB 504 to handle the SeNB 506 EPS bearers can be included in the security key refresh request message 508 or sent in a different message(s).

In the representative embodiment of FIG. 5, the secondary cell release procedure 510 comprises MeNB 504 sending a release request message 512 to SeNB 506. This triggers the procedures on SeNB 506 to remove UE 502. Thus, resources dedicated to supporting UE 502 can be removed from SeNB. Assuming the information to handle its EPS bearers have not previously been sent to the MeNB 504, this release request 512 may trigger such an exchange of information.

The MeNB 504 can also send a secondary cell remove request message 514 to UE 502 to initiate the procedures on UE 502 to remove the SeNB 506 from its cell list. Any additional exchanges to accomplish the removal of SeNB are illustrated by arrow 516. These can include, depending on the embodiment, such exchanges as acknowledgments, handover exchanges (e.g., to let another eNB handle SeNB's 506 EPS bearers), and so forth.

Once the SeNB 506 has been removed, the MeNB 504 initiates the secondary cell addition procedure, shown collectively in FIG. 5 as 518. As part of this procedure, the MeNB 504 can provide configuration information including configuration information for the MeNB for UE capability coordination that can be used as the basis for the reconfiguration/addition of the SeNB 506. This information can be provided separately or as part of a Secondary Cell Addition/Modification message as shown in message 520. This information can also ask the SeNB 506 to handle EPS bearer(s).

The MeNB 504 can also initiate any addition procedures on the UE 502 by sending secondary cell addition request message 522 to UE 502. Secondary cell addition request message 522 can contain information that allows UE 502 to derive the appropriate refreshed security key.

The addition procedure 518 may also include other exchanges 524 between any or all of the UE 502, the MeNB 504 and/or the SeNB 506. Such additional exchanges 524 can include, for example, exchanges between the UE 502 and the SeNB 506 to complete the addition procedure. Additional exchanges 524 may also include any other exchanges between the MeNB 504 and the SeNB 506 to handle appropriate EPS bearers.

While the secondary cell release and addition procedures (e.g., 510 and 518, respectively) have been shown as being triggered by different exchanges, in one embodiment the MeNB 504 can trigger the release and addition procedure with the same RRC message. In this embodiment, there may be no need for other eNBs to handle EPS bearers from the SeNB 506. In this, or in other embodiments, the MeNB 504 can also provide the SeNB 506 with new security key information before the release procedure 510 begins so that there is no need to communicate that information at a later exchange. This also shortens the time between the release and addition procedures and allows the UE 502 and/or the SeNB 506 to immediately initiate the addition procedure at the end of the release procedure without waiting for the MeNB 504 to trigger the addition procedure.

Once the addition procedure 518 is complete, the security key for the SeNB will have been refreshed.

Figure 6:
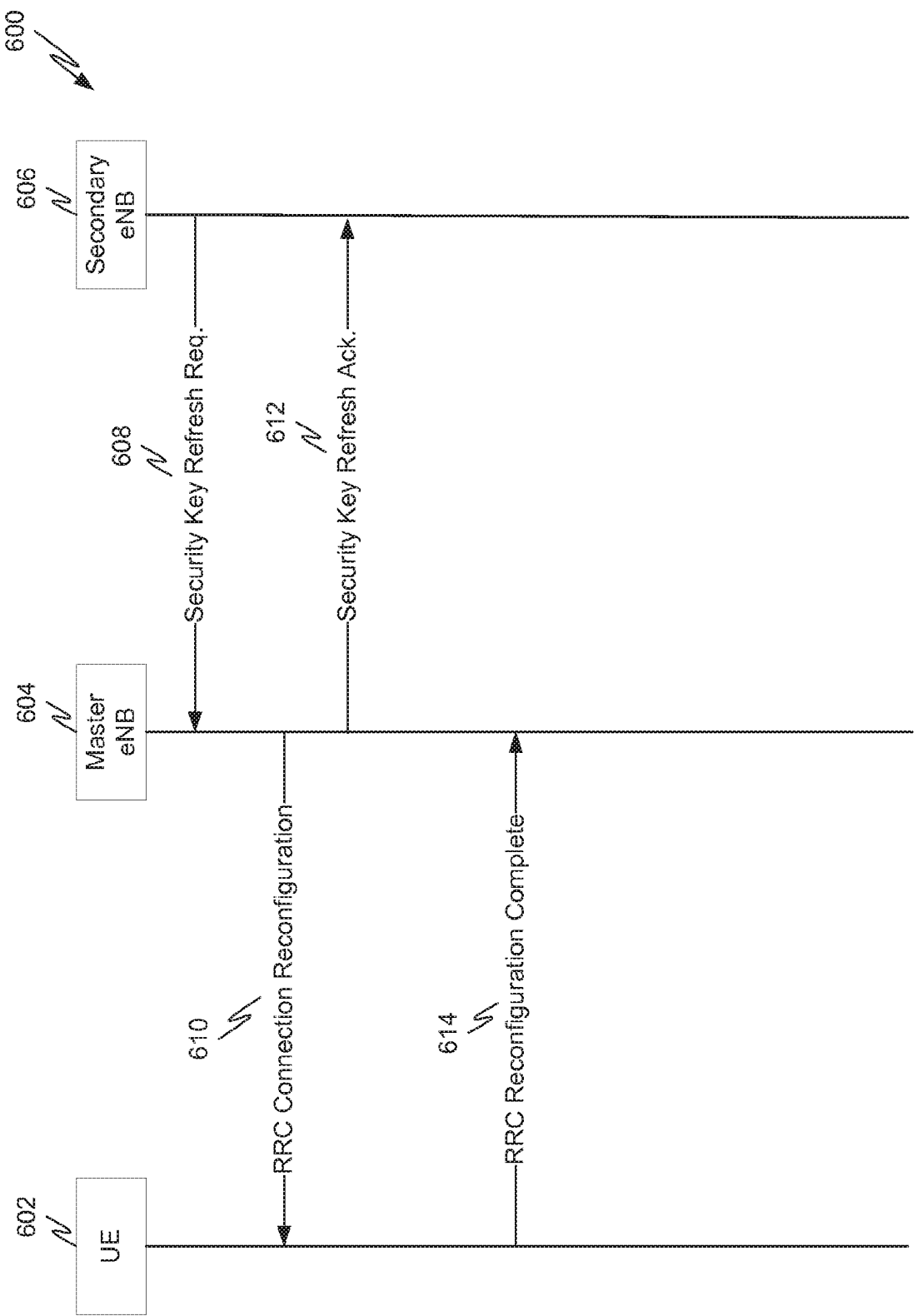
FIG. 6 illustrates an example embodiment for key refresh of a secondary eNB.

FIG. 6 illustrates an example embodiment 600 for key refresh of a SeNB 606. In this embodiment, the security key is refreshed without removal and addition of the SeNB 606. When the SeNB 606 desires to refresh its security key, it sends a security key refresh request message 608 to the MeNB 604. The security key refresh may be triggered by various factors. In one embodiment, the SeNB 606 initiates the security key refresh when its PDCP counts in the EPS bearers (e.g., data connection 444/446 of FIG. 4) configured at the SeNB 606 are about to wrap around. Since there can be multiple data connections/EPS bearers for the SeNB 606, the security key refresh may be triggered when any of the PDCP counts are about to wrap. The security key refresh request message 608 contains the information needed for the MeNB 604 to initiate the refresh using the release/addition procedures. In one embodiment, the message may contain a field indicating the time estimate of when a PDCP count is expected to wrap so that a time from which the new key should be used can be set. Note that this time can be set by the SeNB 606, in which case the security key refresh message can contain a time from which the new key should be used rather than, or in addition to, the time estimate of when a PDCP count is expected to wrap.

The MeNB 604 sends RRC signaling to the UE 602 to refresh the security key for bearers served by the SeNB 606. In a representative embodiment, the MeNB 604 can use the RRC connection reconfiguration message 610. The RRC-ConnectionReconfiguration message as specified in 3GPP TS 36.331 version 8.2.0 Release 8 (November of 2008). As currently specified, the RRCConnectionReconfiguration message is used to perform various functions such as to establish/modify/release radio bearers, to perform handover, to setup/modify/release measurements, to add/modify/release secondary cells, and/or transfer NAS information from an eNB to a UE. With appropriate extensions, the RRC Connection Reconfiguration message 610 can also be used to initiate a security key refresh for SeNB 606.

The RRC Connection Reconfiguration message 610 optionally includes a timing reference indicating a start timing reference (e.g., in frame or sub-frame granularity) that the UE 602 should begin using the new security key. As discussed above, the timing reference may be provided by the MeNB 604, such as being derived from information sent by the SeNB 606 or otherwise determined by the MeNB 604, or the timing reference may be provided by the SeNB 606, depending on the embodiment.

In response to receiving RRC Connection Reconfiguration message 610, the UE 602 can derive a new $K_{eNB}$ key, which is used for communications between the UE 602 and SeNB 606.

The MeNB 604 sends a security key refresh acknowledgment message 612 to the SeNB 606. This message may contain a timing reference (e.g., in frame or sub-frame granularity) indicating when the SeNB 606 should begin using the new key. The message may contain any other desired information, such as information the MeNB 604 should use in deriving the new security key.

The timing of messages 610 and 612 can happen in any order and ordering for these two messages is not significant in some embodiments.

The UE 602 can send a reconfiguration complete message to the MeNB 604 in some embodiments. In a representative example, an RRC Connection Reconfiguration Complete message 614 is used. Although not shown, in some embodiments, the SeNB 606 informs the MeNB 604 that its reconfiguration is complete, to the extent such is not apparent from RRC Connection Reconfiguration Complete message 614.

Example Device Architecture and
Machine-Readable Medium

Figure 7:
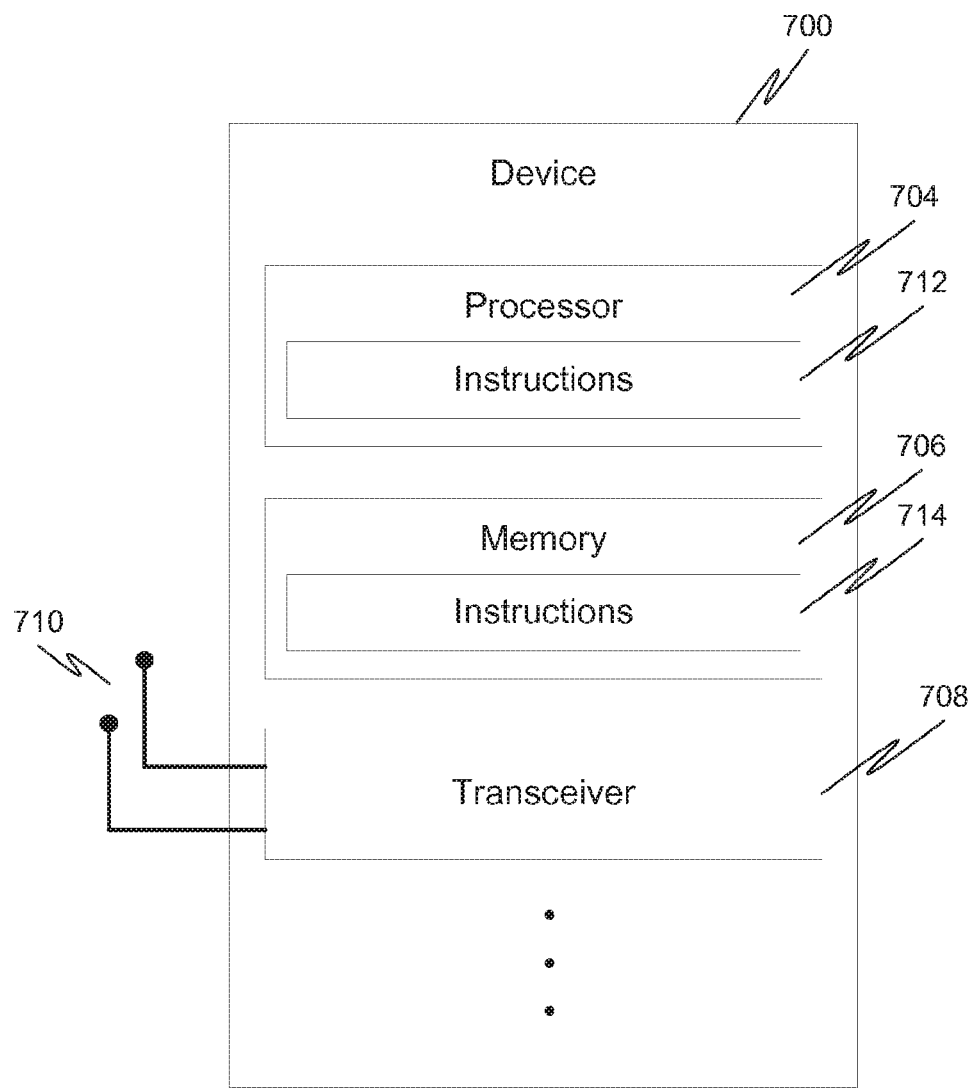
FIG. 7 illustrates a system block diagram of a wireless device, according to some embodiments.

FIG. 7 illustrates a system block diagram of a wireless device 700, according to some embodiments. Such a wireless device 700 can represent, for example, a MeNB, a SeNB and/or a UE as described in conjunction with FIGS. 1-6 above. The procedures, message exchanges, and so forth described above are suitable for implementation on the illustrated device 700.

The device 700 may include a processor 704, a memory 706, a transceiver 708, antennas 710, instructions 712, 714, and possibly other components (not shown).

The processor 704 comprises one or more central processing units (CPUs), graphics processing units (GPUs), accelerated processing units (APUs), signal processors, or various combinations thereof. The processor 704 provides processing and control functionalities for the device 700 and may implement the flow diagrams and logic described above for the eNBs and UEs of FIGS. 1-6.

The memory 706 comprises one or more transient and/or static memory units configured to store instructions 712, 714 and data for the device 700. The transceiver 708 comprises one or more transceivers including, for an appropriate station or responder, a multiple-input and multiple-output (MIMO) antenna to support MIMO communications. For the device 700, the transceiver 708 receives transmissions and transmits transmissions. The transceiver 708 may be coupled to the antennas 710, which represent an antenna or multiple antennas, as appropriate to the device 700. As described in the figures above, the UE and eNB may operate in a primary band and a secondary bands and may be adapted to tune to any secondary band to which license is granted.

The instructions 712, 714 comprise one or more sets of instructions or firmware/software executed on a computing device (or machine) to cause such a computing device (or machine) to perform any of the methodologies discussed herein. The instructions 712, 714 (also referred to as computer- or machine-executable instructions) may reside, completely or at least partially, within the processor 704 and/or the memory 706 during execution thereof by the device 700. While the instructions 712 and 714 are illustrated as separate, they can be part of the same whole. The processor 704 and the memory 706 also comprise machine-readable storage media. The instructions 712 and 714 may implement, for example, all or part of the flow associated with FIGS. 5-6 attributed to the eNBs and/or the UE. Additionally, or alternatively, the instructions 712 and 714 may implement other processing and functionality discussed in conjunction with the other embodiments above.

Processing Circuitry

In FIG. 7, processing and control functionalities are illustrated as being provided by the processor 704 along with the associated instructions 712 and 714. However, these are only examples of processing circuitry that comprise programmable logic or circuitry (e.g., as encompassed within a general-purpose processor 804 or other programmable processor) that is temporarily configured by software or firmware to perform certain operations. In various embodiments, processing circuitry may comprise dedicated circuitry or logic that is permanently configured (e.g., within a special-purpose processor, application specific integrated circuit (ASIC), or array) to perform certain operations. It will be appreciated that a decision to implement processing circuitry mechanically, in dedicated and permanently configured circuitry, or in temporarily configured circuitry (e.g., configured by software) may be driven by cost, time, energy-usage, package size, or other considerations.

Accordingly, the term "processing circuitry" should be understood to encompass a tangible entity, be that an entity that is physically constructed, permanently configured (e.g., hardwired), or temporarily configured (e.g., programmed) to operate in a certain manner or to perform certain operations described herein.

Machine-Readable Medium

The instructions 712, 714 are illustrated as being sored on memory 706 and/or in processor 704. While the memory 706 and/or processor 704 is shown in an example embodiment to be a single medium, the term "machine-readable medium" may include a single medium or multiple media (e.g., a centralized or distributed database, and/or associated caches and servers) that store the one or more instructions or data structures. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks. The term machine-readable medium specifically excludes non-statutory signals per se.

Transmission Medium

The instructions 712/714 may further be transmitted or received such as by transceiver circuitry 708 and/or antennas 710 using a transmission medium. The instructions 712/714 may be transmitted using any one of a number of well-known transfer protocols. Transmission medium encompasses mechanisms by which the instructions 712/714 are transmitted, such as communication networks. The term "transmission medium" shall be taken to include any intangible medium that is capable of storing, encoding or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The following represent various example embodiments.

1. A method performed by a first enhanced Node B (eNB) comprising:
   receiving, from a second eNB, a request to refresh a security key used by the second eNB;
   sending a release request to the second eNB that causes the second eNB to release resources dedicated to a User Equipment (UE);
   sending a remove request to the UE that causes the UE to remove the second eNB from its eNB list;
   sending a Secondary Cell Addition/Modification message to the second eNB, the Secondary Cell Addition/Modification message comprising configuration information for the second eNB;
   sending an eNB addition request to the UE that causes the UE to add the second eNB to its eNB list.

2. The method of example 1, wherein the release request and the configuration information are sent in the same message to the second eNB.

3. The method of example 1 or 2, wherein sending the release request and sending the remove request are part of a cell release procedure.

4. The method of example 1 or 2, wherein sending the Secondary Cell Addition/Modification message and sending the eNB addition request are part of a cell addition procedure.

5. The method of example 1 or 2, wherein the second eNB is a secondary cell eNB.

6. A wireless device comprising:
   at least one antenna;
   transceiver circuitry coupled to the at least one antenna;
   memory;
   a processor coupled to the memory and transceiver circuitry; and
   instructions, stored in the memory, which when executed cause the processor to:
   receive, from a second eNB, a request to refresh a security key used by the second eNB;
   send a release request to the second eNB that causes the second eNB to release resources dedicated to a User Equipment (UE);
   send a remove request to the UE that causes the UE to remove the second eNB from its eNB list;
   send a Secondary Cell Addition/Modification message to the second eNB, the Secondary Cell Addition/Modification message comprising configuration information for the second eNB;
   send an eNB addition request to the UE that causes the UE to add the second eNB to its eNB list.

7. The device of example 6, wherein the release request and the configuration information are sent in the same message to the second eNB.

8. The device of example 6 or 7, wherein sending the release request and sending the remove request are part of a cell release procedure.

9. The device of example 6 or 7, wherein sending Secondary Cell Addition/Modification message and sending the eNB addition request are part of a cell addition procedure.

10. The device of example 6 or 7, wherein sending the second eNB is a secondary cell eNB.

11. A machine readable medium having executable instructions embodied thereon that, when executed, configure a device to:
   receive, from a second eNB, a request to refresh a security key used by the second eNB;
   send a release request to the second eNB that causes the second eNB to release resources dedicated to a User Equipment (UE);
   send a remove request to the UE that causes the UE to remove the second eNB from its eNB list;
   send a Secondary Cell Addition/Modification message to the second eNB, the Secondary Cell Addition/Modification message comprising configuration information for the second eNB;
   send an eNB addition request to the UE that causes the UE to add the second eNB to its eNB list.

12. The machine readable medium of example 11, wherein the release request and the configuration information are sent in the same message to the second eNB.

13. The machine readable medium of example 11 or 12, wherein sending the release request and sending the remove request are part of a cell release procedure.

14. The machine readable medium of example 11 or 12, wherein sending the Secondary Cell Addition/Modification message and sending the eNB addition request are part of a cell addition procedure.

15. The machine readable medium of example 11 or 12, wherein sending the second eNB is a secondary cell eNB.

16. A method performed by a first enhanced Node B (eNB) comprising:
   receiving, from a second eNB, a request to refresh a security key used by the second eNB;
   sending, to a User Equipment (UE), an RRC signaling request causing the UE to refresh a security key for radio bearers served by the second eNB;
   receiving, from the UE, a message indicating that the refresh for the security key has been completed.

17. The method of example 16, wherein the RRC signaling request uses an RRCConnectionReconfiguration message.

18. The method of example 16, RRC signaling request further comprises a timing reference indicating a timing reference from which the UE should begin using the refreshed security key.

19. The method of example 16 or 18, further comprising sending, to the second eNB, a security key refresh acknowledgment message.

20. The method of example 19, wherein the security key refresh acknowledgment message comprises a timing reference from which the second eNB should begin using the refreshed security key.

21. The method of example 16, 17 or 18, wherein the message indicating that the refresh for the security key has been completed uses an RRCConnectionReconfigurationComplete message.

22. A wireless device comprising:
   at least one antenna;
   transceiver circuitry coupled to the at least one antenna;
   memory;

a processor coupled to the memory and transceiver circuitry; and
instructions, stored in the memory, which when executed cause the processor to:
receive, from a second eNB, a request to refresh a security key used by the second eNB;
send, to a User Equipment (UE), an RRC signaling request causing the UE to refresh a security key for radio bearers served by the second eNB;
receive, from the UE, a message indicating that the refresh for the security key has been completed.

23. The device of example 22, wherein the RRC signaling request uses an RRCConnectionReconfiguration message.

24. The device of example 22, RRC signaling request further comprises a timing reference indicating a timing reference from which the UE should begin using the refreshed security key.

25. The device of example 22 or 24, further comprising sending, to the second eNB, a security key refresh acknowledgment message.

26. The device of example 25, wherein the security key refresh acknowledgment message comprises a timing reference from which the second eNB should begin using the refreshed security key.

27. The device of example 22, 23 or 24, wherein the message indicating that the refresh for the security key has been completed uses an RRCConnectionReconfigurationComplete message.

28. A machine readable medium having executable instructions embodied thereon that, when executed, configure a device to:
receive, from a second eNB, a request to refresh a security key used by the second eNB;
send, to a User Equipment (UE), an RRC signaling request causing the UE to refresh a security key for radio bearers served by the second eNB;
receive, from the UE, a message indicating that the refresh for the security key has been completed.

29. The machine readable medium of example 28, wherein the RRC signaling request uses an RRCConnectionReconfiguration message.

30. The machine readable medium of example 28, RRC signaling request further comprises a timing reference indicating a timing reference from which the UE should begin using the refreshed security key.

31. The machine readable medium of example 28 or 30, further comprising sending, to the second eNB, a security key refresh acknowledgment message.

32. The machine readable medium of example 31, wherein the security key refresh acknowledgment message comprises a timing reference from which the second eNB should begin using the refreshed security key.

33. The machine readable medium of example 28, 29 or 30, wherein the message indicating that the refresh for the security key has been completed uses an RRCConnectionReconfigurationComplete message.

34. A method performed by a secondary enhanced Node B (eNB) comprising:
sending, to a master eNB, a request to refresh a security key used by the secondary eNB;
receiving a release request from the master eNB that causes the secondary eNB to release resources dedicated to a User Equipment (UE);
receiving a Secondary Cell Addition/Modification message from the master eNB, the Secondary Cell Addition/Modification message comprising configuration information for the secondary eNB;
refreshing the security key according to the received RRC configuration information.

35. The method of example 34, wherein the release request and the configuration information are received in the same message.

36. The method of example 34 or 35, wherein the release request is part of a cell release procedure.

37. The method of example 34 or 35, wherein the Secondary Cell Addition/Modification message is part of a cell addition procedure.

38. The method of example 34 or 35, wherein refreshing the security key comprises deriving a new KeNB.

39. A secondary eNB comprising:
at least one antenna;
transceiver circuitry coupled to the at least one antenna;
memory;
a processor coupled to the memory and transceiver circuitry; and
instructions, stored in the memory, which when executed cause the processor to:
send, to a master eNB, a request to refresh a security key used by the secondary eNB;
receive a release request from the master eNB that causes the secondary eNB to release resources dedicated to a User Equipment (UE);
receive a Secondary Cell Addition/Modification message from the master eNB, the Secondary Cell Addition/Modification message comprising configuration information for the secondary eNB;
refresh the security key according to the received configuration information.

40. The secondary eNB of example 39, wherein the release request and the configuration information are sent in the same message.

41. The secondary eNB of example 39 or 40, wherein the release request is part of a cell release procedure.

42. The secondary eNB of example 39 or 40, wherein the Secondary Cell Addition/Modification message is part of a cell addition procedure.

43. The secondary eNB of example 39 or 40, wherein refreshing the security key comprises deriving a new KeNB.

44. A machine readable medium having executable instructions embodied thereon that, when executed, configure a device to:
send, to a master eNB, a request to refresh a security key used by the secondary eNB;
receive a release request from the master eNB that causes the secondary eNB to release resources dedicated to a User Equipment (UE);
receive a Secondary Cell Addition/Modification message from the master eNB, the Secondary Cell Addition/Modification message comprising configuration information for the secondary eNB;
refresh the security key according to the received configuration information.

45. The machine readable medium of example 44, wherein the release request and the configuration information are sent in the same message.

46. The machine readable medium of example 44 or 45, wherein the release request is part of a cell release procedure.

47. The machine readable medium of example 44 or 45, wherein the Secondary Cell Addition/Modification message is part of a cell addition procedure.

48. The machine readable medium of example 44 or 45, wherein refreshing the security key comprises deriving a new KeNB.

49. A method performed by a first enhanced Node B (eNB) comprising:
sending, to a second eNB, a request to refresh a security key used by the first eNB, the request causing the second eNB to communicate security key refresh information to a User Equipment (UE);
receiving, from the second eNB, a security key refresh acknowledgment message;
wherein either the request to refresh the security key or the security key refresh acknowledgement message or both include a timing reference indicating when a new security key should be used by the first eNB.

50. The method of example 49, wherein the security key refresh acknowledgment message comprises information used by the first eNB to derive the new security key.

51. The method of example 49, wherein the request to refresh the security key comprises the timing reference.

52. The method of example 49, wherein the security key refresh acknowledgment message comprises the timing reference.

53. The method of example 49, 50, 51 or 52, wherein the security key refresh information communicated to the UE comprises the timing reference.

54. The method of example 49, 50, 51 or 52, wherein the security key refresh information communicated to the UE causes the UE to derive a new KeNB used to communicate with the first eNB.

55. The method of example 54, further comprising communicating with the UE using the new KeNB.

56. A secondary eNB comprising:
at least one antenna;
transceiver circuitry coupled to the at least one antenna;
memory;
a processor coupled to the memory and transceiver circuitry; and
instructions, stored in the memory, which when executed cause the processor to:
send, to a master eNB, a request to refresh a security key used by the secondary eNB, the request causing the master eNB to communicate security key refresh information to a User Equipment (UE);
receive, from the master eNB, a security key refresh acknowledgment message;
wherein either the request to refresh the security key or the security key refresh acknowledgement message or both include a timing reference indicating when a new security key should be used by the secondary eNB.

57. The secondary eNB of example 56, wherein the security key refresh acknowledgment message comprises information used by the secondary eNB to derive the new security key.

58. The secondary eNB of example 56, wherein the request to refresh the security key comprises the timing reference.

59. The secondary eNB of example 56, wherein the security key refresh acknowledgment message comprises the timing reference.

60. The secondary eNB of example 56, 57, 58 or 59, wherein the security key refresh information communicated to the UE comprises the timing reference.

61. The secondary eNB of example 56, 57, 58 or 59, wherein the security key refresh information communicated to the UE causes the UE to derive a new KeNB used to communicate with the first eNB.

62. The secondary eNB of example 61, further comprising communicating with the UE using the new KeNB.

63. A machine readable medium having executable instructions embodied thereon that, when executed, configure a device to:
send, to a master eNB, a request to refresh a security key used by the secondary eNB, the request causing the master eNB to communicate security key refresh information to a User Equipment (UE);
receive, from the master eNB, a security key refresh acknowledgment message;
wherein either the request to refresh the security key or the security key refresh acknowledgement message or both include a timing reference indicating when a new security key should be used by the secondary eNB.

64. The machine readable medium of example 63, wherein the security key refresh acknowledgment message comprises information used by the secondary eNB to derive the new security key.

65. The machine readable medium of example 63, wherein the request to refresh the security key comprises the timing reference.

66. The machine readable medium of example 63, wherein the security key refresh acknowledgment message comprises the timing reference.

67. The machine readable medium of example 63, 64, 65 or 66, wherein the security key refresh information communicated to the UE comprises the timing reference.

68. The machine readable medium of example 63, 64, 65 or 66, wherein the security key refresh information communicated to the UE causes the UE to derive a new KeNB used to communicate with the first eNB.

69. The machine readable medium of example 68, further comprising communicating with the UE using the new KeNB.

70. User Equipment comprising:
at least one antenna;
transceiver circuitry coupled to the at least one antenna;
memory;
a processor coupled to the memory and transceiver circuitry; and
instructions, stored in the memory, which when executed cause the processor to:
receive, via the at least one antenna and transceiver circuitry, a control message from an enhanced Node B (eNB) requesting refresh of a security key used to communicate with a second eNB;
derive a new KeNB used by the UE to communicate with the second eNB.

71. The UE of example 70 wherein the control message is a Radio Resource Control (RRC) Connection Reconfiguration message.

72. The UE of example 70 wherein the control message further comprises a timing reference indicating the time at which the new KeNB should be used to communicate with the second eNB.

73. The UE of example 70 wherein the eNB is a master eNB and the second eNB is a secondary eNB.

74. The UE of example 70, 71, 72 or 73 wherein the instructions further cause the processor to send, via the transceiver circuitry, a RRC Reconfiguration Complete message.

What is claimed is:
1. A method performed by a first base station, comprising:
receiving, from a second base station, a request to refresh a security key used by the second base station;
sending, to a user equipment (UE) that is connected to the first base station and the second base station simultaneously through Dual Connectivity (DC), a radio resource control (RRC) signaling to the UE to effectuate a security key refresh corresponding to the second base station; and receiving, from the UE, a message indicating that the security key refresh has been completed.

2. The method of claim 1, wherein the first base station is a primary master base station and the second base station is a secondary base station in the DC.

3. The method of claim 1, wherein the request to refresh the security key is received before Packet Data Convergence Protocol (PDCP) count for a bearer is about to wrap around.

4. The method of claim 1, wherein the RRC signaling to the UE to effectuate the security key refresh is an RRCConnectionReconfiguration message, and the message indicating that the security key refresh has been completed is an RRCConnectionReconfigurationComplete message.

5. The method of claim 1, wherein security key refresh information communicated to the UE causes the UE to derive a new security key used to communicate with the second base station.

6. The method of claim 1, further comprising:
sending, to the second base station, a security key refresh acknowledgement message.

7. The method of claim 6, wherein only the first base station has a control plane in the UE.

8. The method of claim 6, wherein the security key refresh acknowledgement message comprises a timing reference from which the second base station should begin using the security key that has been refreshed.

9. An apparatus comprising:
one or more hardware processors, configured to cause a user equipment (UE) to:
receive a control message from a first base station to refresh a security key used to communicate with a second base station, wherein the control message is sent by the first base station in response to the second base station sending a request to refresh the security key to the first base station, wherein the UE is connected to the first and the second base stations simultaneously through Dual Connectivity (DC);
derive a new security key used by the UE to communicate with the second base station; and
send a message indicating that a refresh for the security key has been completed.

10. The apparatus of claim 9, wherein the first base station is a primary master base station and the second base station is a secondary base station in the DC.

11. The apparatus of claim 9, wherein the first base station is configured to send a security key refresh acknowledgement message to the second base station, wherein the security key refresh acknowledgement message comprises information used by the second base station to derive the new security key.

12. The apparatus of claim 9, wherein the control message to refresh the security key is an RRCConnectionReconfiguration message, and the message indicating that the refresh for the security key has been completed is an RRCConnectionReconfigurationComplete message.

13. The apparatus of claim 9, wherein the request to refresh the security key is received by the first base station before Packet Data Convergence Protocol (PDCP) count for a bearer is about to wrap around.

14. The apparatus of claim 9, wherein only the first base station has a control plane in the UE.

15. A user equipment (UE), comprising:
transceiver circuitry; and
one or more processors coupled to the transceiver circuitry, wherein the one or more processors are configured to cause the UE to:
receive a control message from a first base station to refresh a security key used to communicate with a second base station, wherein the control message is sent by the first base station in response to the second base station sending a request to refresh the security key to the first base station, wherein the UE is connected to the first and the second base stations simultaneously through Dual Connectivity (DC);
derive a new security key used by the UE to communicate with the second base station; and
send a message indicating that a refresh for the security key has been completed.

16. The UE of claim 15, wherein the first base station is a primary master base station and the second base station is a secondary base station in the DC.

17. The UE of claim 15, wherein the first base station is configured to send a security key refresh acknowledgement message to the second base station, wherein the security key refresh acknowledgement message comprises information used by the second base station to derive the new security key.

18. The UE of claim 15, wherein the control message to refresh the security key is an RRCConnectionReconfiguration message, and the message indicating that the refresh for the security key has been completed is an RRCConnectionReconfigurationComplete message.

19. The UE of claim 15, wherein the request to refresh the security key is received by the first base station before Packet Data Convergence Protocol (PDCP) count for a bearer is about to wrap around.

20. The UE of claim 15, wherein only the first base station has a control plane in the UE.

* * * * *